US006744821B1

(12) United States Patent
Van Acker et al.

(10) Patent No.: US 6,744,821 B1
(45) Date of Patent: Jun. 1, 2004

(54) MULTICARRIER RECEIVER

(75) Inventors: Kathleen Peggie Florimond Van Acker, Rumst (BE); Geert Jozef Thérèse Leus, Hasselt (BE); Marc Suzanne Paul Moonen, Heverlee (BE); Thierry Pollet, Mechelen (BE); Olivier René Christian Van de Wiel, Le Cannet-Rocheville (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/340,207

(22) Filed: Jun. 28, 1999

(30) Foreign Application Priority Data

Jun. 29, 1998 (EP) .............................. 98401609
Jun. 24, 1999 (EP) .............................. 99401572

(51) Int. Cl.$^7$ ................................ H04K 1/10
(52) U.S. Cl. ........................................ 375/260
(58) Field of Search .......................... 375/260, 316, 375/219, 222, 229, 232

(56) References Cited

U.S. PATENT DOCUMENTS

| | | | | |
|---|---|---|---|---|
| 5,432,859 A | * | 7/1995 | Yang et al. ............... | 381/71.11 |
| 5,689,528 A | * | 11/1997 | Tsujimoto ................ | 375/233 |
| 6,047,025 A | * | 4/2000 | Johnson et al. ........... | 375/232 |
| 6,246,698 B1 | * | 6/2001 | Kumar ..................... | 375/347 |
| 6,507,585 B1 | * | 1/2003 | Dobson .................... | 375/220 |

OTHER PUBLICATIONS

"A Multicarrier E1–HDSL Transceiver System with Coded Modulation" Peter S. Chow, John M. Cioffi and John A.S. Bingham vol. 4, No. 3, May–Jun. 1993 Journal of European Transactions on Telecommunications and Related Technologies and Related Technologies (ETT), pp. 257–266.

Orthogonal Frequency Division Multiplexing OFDM: An Alternative Digital Modulation Scheme Specs International, Jan. 1993, pp. 4–8.

"Multicarrier Modulation for Date Transmission: An Idea Whose Time Has Come" John A.C. Bingham, May 1999 IEEE Communications Magazine.

"An Improved Optimization Algorithm for Time Domain Equalizer Design in ADSL Modems" Katleen Van Acker, et al.: Alcatel Telecom.

Farhang–Boroujeny, B. et al.: "Generalized Sliding FFT and its Application to Implementation of Block LS Adaptive Filters" IEEE Transactions on Signal Processing, vol. 42, No. 3, Mar. 1, 1994, pp. 532–537, XP000450708.

* cited by examiner

*Primary Examiner*—Don N. Vo
(74) *Attorney, Agent, or Firm*—Sughrue Mion, PLLC

(57) ABSTRACT

A multicarrier receiver (RX') comprises the cascade connection of a sliding Fourier transformer (SLIDING FFT) which subsequently Fourier transforms parts of an incoming cyclically extended multicarrier symbol (MS), and a per-carrier frequency domain equaliser (PC-FEQ) including for each carrier a tapped delay line (TD1, TD2, . . . , TDN/2) for equalising the Fourier transformed parts of the incoming multicarrier symbol (MS). The per-carrier frequency domain equaliser (PC-FEQ) allows to optimise the system capacity individually per carrier, and in a preferred embodiment of the invention includes tapped delay lines (TD1, TD2, . . . , TDN/2) with adaptive complex taps, with an adaptive length and with an individual delay that may differ for different carriers.

8 Claims, 2 Drawing Sheets

MULTICARRIER RECEIVER

BACKGROUND OF THE INVENTION

The present invention relates to a multicarrier receiver for receiving a sequence of cyclically extended multicarrier symbols.

Such a multicarrier receiver is already known in the art, e.g. from the article 'A Multicarrier E1-HDSL Transceiver System with Coded Modulation' from the authors Peter S. Chow, Naofol Al-Dhohir, John M. Cioffi and John A. C. Bingham. This article was published in Vol. 4, No. 3, May–June 1993 of the Journal of European Transodions on Telecommunications and Related Technologies (ETT), pages 257–266. Therein, FIG. 5 represents a block scheme of a multicarrier receiver which is able to receive a sequence of cyclically extended multicarrier symbols, the so called discrete multi-tone (DMT) symbols. The effect of intersymbol interference due to transmission of the DMT symbols over a channel between multicarrier transmitter and multicarrier receiver can be removed by adding a cyclic extension to each DMT symbol with a length superior to the channel impulse response length. The data rote however reduces linearly proportionally to the length of the cyclic prefix that is added to the DMT symbols so that the length of the cyclic extension of DMT symbols has to be limited to an acceptable number. If the channel impulse response is larger than the cyclic extension, remaining intersymbol interference (ISI) will depend from the part of the impulse response exceeding the cyclic extension length. To compensate for this remaining intersymbol interference (ISI), the received DMT symbols are equalised by a time domain equaliser TEQ which is an adaptive traditional linear equaliser that allows to reduce the length of the cyclic prefix of DMT symbols to an acceptable number of bits by flattening the transmission line impulse response. After being equalised in the time domain, the DMT symbols are serial-to-parallel converted, their cyclic extension is removed, and the non extended DMT symbols are applied to the input of a fast Fourier transformer FFT which demodulates the DMT symbols by converting the symbols from time domain to frequency domain.

Although different carriers or tones may be affected differently when transmitted over the channel, the time domain equaliser proposed by Peter S. Chow et al. in the above mentioned article equalises all carriers of the multicarrier symbol in the same way and as a result limits the performance of the multicarrier system unduly. Indeed, since the known equaliser cannot be optimised individually per carrier, this equaliser is not able to fully optimise the capacity of the system. Carriers which are more affected than others for instance are not equalised more intensively. If for instance part of the carriers are unused, equalisation thereof, although not necessary, is not avoided. The equalisation is performed for all carriers, because of the structure, and by no means it is possible not to equalise groups of carriers, for example the unused ones. Equivalently, in the known system the equalisation complexity does not reduce if part of the carriers ore unused and the equalisation effort cannot be concentrated on equalisation of the more affected carriers with as consequence that the performance of the known system is not fully optimised.

SUMMARY OF THE INVENTION

An object of the present invention is to provide a multicarrier receiver of the above known type, but whose performance is increased whilst its complexity is kept at the some level, or even smaller levels.

According to the invention, this object is achieved by the multicarrier receiver defined in claim 1.

In this way, by replacing the known time domain equaliser with a per carrier frequency domain equaliser acting on the output of a sliding Fourier transformer, channel equalisation for one carrier is made independent from channel equalisation for the other carriers. The taps for equalisation of a carrier can be set independently from the tap settings for equalisation of other carriers so that performance can be individually optimised per carrier. Furthermore, if the tapped delay lines used for equalisation of more affected carriers include more taps than tapped delay lines used for less affected carriers, equalisation effort is concentrated on the most affected carriers. In particular, if the number of taps in a tapped delay lines used for equalisation of an unused carrier is made zero, no effort is wasted to equalise such an unused carrier.

It is remarked that although at first glance, replacing the fast Fourier transformer of the known multicarrier receiver with a sliding Fourier transformer significantly increases the complexity of the multicarrier receiver, efficient implementation of this sliding Fourier transformer, increases the complexity only in a negligible way, or even allow smaller complexities as it is explained further in this application.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B. In this respect, it is noticed for instance that the multicarrier receiver according to the present invention may be equipped with a windowing unit as described in the European Patent Application EP 0 802 649, entitled 'Method and windowing unit to reduce leakage, Fourier transformer and DMT modem wherein the unit is used'.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

An additional feature of the multicarrier receiver according to the present invention is defined in claim 2.

Thus, the gain in performance compared to the known system is even more increased in case the per-carrier frequency domain equaliser is provided with adaptive taps. Indeed, whereas in an adoptive version of the known multicarrier receiver, adaptation of the equaliser taps inevitably had an influence on all carriers, the taps of a tapped delay line equalising one carrier according to the present invention can be adapted independently from the taps of other tapped delay lines equalising other carriers.

A further feature of the present invention is defined in claim 3.

Hence, in a preferred embodiment of the invention, the signal to noise ratio for transmission of multicarrier symbols over a channel between a multicarrier transmitter and the multicarrier receiver of the present invention is maximised via a mean square error criterion which allows to determine the complex tap values of the per-carrier frequency domain equaliser in which an error function expressing the mean squared difference between received and expected carrier's QAM (Quadrature Amplitude Modulation) symbols is minimised.

Another advantageous feature of the multicarrier receiver according to the present invention is defined in claim 4.

In this way, the gain in performance compared to the known system is yet more increased, and the search for the optimal equaliser is simplified. Indeed, whereas in an advanced version of the known mulicarrier receiver, the number of equaliser taps is adjustable for all carriers in the same way, the number of taps of the tapped delay lines in the present multicarrier receiver can be increased or decreased independently from each other so that equalising effort can be concentrated on the most affected carriers whilst less affected carriers or unused carriers can be equalised slightly. If a carrier suddenly becomes more affected, the number of taps in the tapped delay line associated with this carrier is increased to improve equalisation and the complex tap values of the enlarged tapped delay line are re-calculated to optimally compensate for the increased noise. Similarly, if noise affecting a carrier suddenly decreases or if a carrier is less intensively used because less data bits are allocated thereto for instance, the number of taps in the tapped delay line associated with this carrier is decreased and the complex tap values for the remaining taps are re-calculated so that the remaining taps allow a sufficient resistance with respect to the noise.

Also an advantageous feature is defined by claim 5.

In this way, by allowing different individual delays for different carriers, the number of taps in the tapped delay lines can be decreased thus reducing the total complexity of the multicarrier receiver.

Furthermore, an advantageous feature of the present invention is defined in claim 6.

Indeed, if it is assumed that the first and second part that have to be Fourier transformed respectively start with the first and second sample of a received extended multicarrier symbol, then this second part only differ from the first part in that it does not contain the first sample thereof and in that its last sample was not contained by the first part. Since the Fourier transformation is a linear operation, the contribution of the first sample of the first part to the Fourier transform of the first part can be subtracted from this Fourier transform of the first part and a contribution of the last sample of the second part can be added to the Fourier transform of the first part to obtain the Fourier transform of the second part. If this principle is incrementally repeated, the sliding Fourier transformer has to calculate only one full Fourier transform per received multicarrier symbol and can determine all other Fourier transforms with negligible effort (only additions and subtractions).

Still another feature of the present multicarrier receiver is defined in claim 7.

In this way, the sliding Fourier transformer is implemented by a traditional Fourier transformer, preferably applying the fast Fourier transform algorithm, and some complexity in the per-carrier frequency domain equaliser whose taps now contain a first contribution for equalisation of the channel and a second contribution for achieving the sliding Fourier transformation.

Yet another advantageous feature of the present invention is defined in claim 8.

Indeed, as will be explained later on in the description, the major portion of the RLS-based computations for iterative update of the equaliser taps is common for all carriers in the embodiment of the present invention according to claim 8. As a consequence, the optimal convergence properties of the RLS based technique become achievable without unacceptable computational cost. Simulations have shown that at initialisation acceptable convergence is achieved with less than 100 training symbols when RLS based updating is used whereas LMS based initialisation of the taps of a multicarrier frequency domain equaliser requires thousands of training symbols to be processed.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
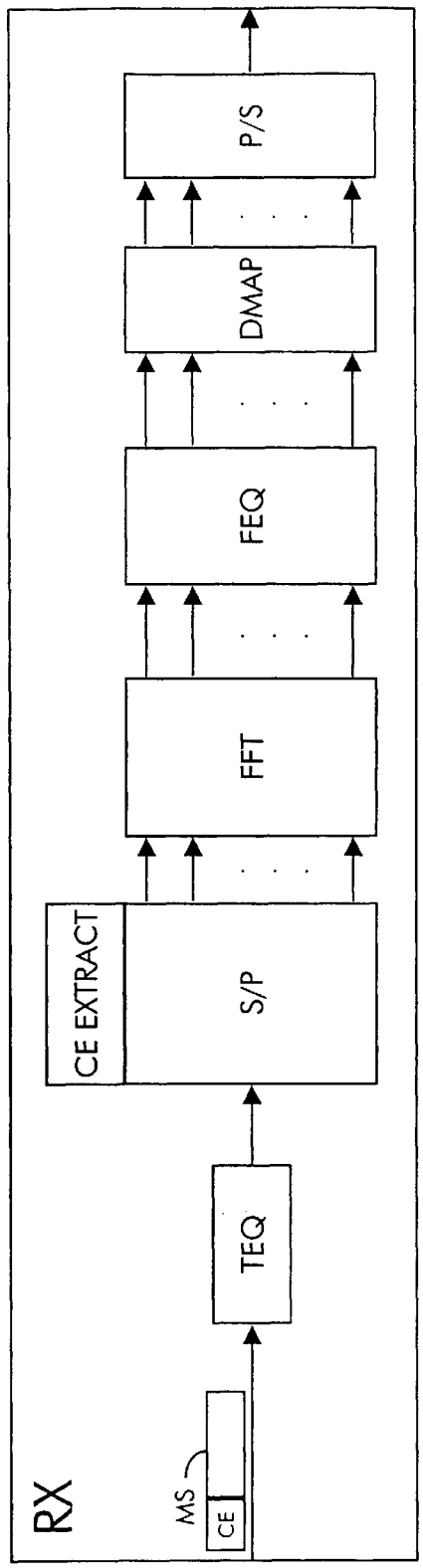
FIG. 1 represents a block scheme of a known multicarrier receiver RX.

The multicarrier receiver RX drawn in FIG. 1 includes a time domain a equaliser TEQ, a serial to parallel converter S/P with cyclic extension extractor CE EXTRACT, a fast Fourier transformer FFT, a frequency domain equaliser FEQ, a demapper DMAP, and a parallel to serial converter P/S.

The time domain equaliser TEQ, serial to parallel converter S/P with cyclic prefix extractor CE EXTRACT, the fast Fourier transformer FFT, the frequency domain equaliser FEQ, the demapper DMAP and the parallel to serial converter P/S ore cascade coupled between an input and output part of the multicarrier receiver RX.

The multicarrier receiver RX is able to receive and demodulate multicarrier symbols MS that are cyclically extended. The cyclic extension CE is added to the multicarrier symbols to avoid intersymbol interference between consecutively transmitted multicarrier symbols, or intercarrier interference arising in the same DMT symbol, or between consecutive DMT symbols. Intersymbol interference however can only be compensated fully if the cyclic extension CE is longer than the impulse response of the transmission channel between multicarrier transmitter and multicarrier receiver RX. It is the task of the time domain equaliser TEQ to shorten the impulse response length of the channel so that it does not exceed the length of the cyclic extension CE. The time domain equaliser TEQ thereto contains a set of adaptive taps whose values are set in accordance with a mean square error (MSE) criterion as described for instance in the European Patent Application EP 0 768 778, entitled 'Method for transmission line impulse response equalisation and a device to perform this method'. If a multicarrier symbol MS has passed the equalised channel (transmission channel+time domain equaliser TEQ), the samples thereof are serial to parallel converted by the serial to parallel converter S/P and the cyclic prefix extractor CE EXTRACT subtracts the cyclic extension CE from the multicarrier symbol MS so that a non-extended multicarrier symbol is applied to the fast Fourier transformer FFT for time to frequency domain conversion. The frequency domain multicarrier symbol at the output of the fast Fourier transformer FFT is supplied to the frequency domain equaliser FEQ which typically contains one complex tap per carrier to compensate for each carrier the phase rotation and attenuation due to transmission over the channel. For the so obtained carriers the demapper DMAP decodes the exact amount of bits from each carrier using the appropriate constellation schemes and the bits at the output of the demapper DMAP are serialised by the parallel to serial converter P/S.

As already mentioned in the introductory part of this application, the time domain equaliser TEQ in a multicarrier receiver RX with the known architecture cannot treat different carriers of the multicarrier symbol MS differently although different carriers may be differently affected by noise on the transmission channel. Computational efficient algorithms to determine the taps of the time domain equaliser TEQ are not able to fully optimise the capacity of the system, whereas algorithms that optimise the system capacity are not easy to implement because of their computational complexity. Moreover, the system capacity in a multicarrier transmission system wherein the known multicarrier receiver RX is used, is very sensitive for symbol alignment in the time domain equaliser TEQ. Experiments show that the system capacity can change for differences in target impulse response alignment of one sample in the time domain equaliser TEQ. Concluding, the known multicarrier receiver structure with time domain equaliser TEQ preceding the fast Fourier transformer FFT suffers from several drawbacks. These drawbacks all disappear if the architecture of the multicarrier receiver RX is changed into that of the multicarrier receiver RX' drawn in FIG. 2.

Figure 2:
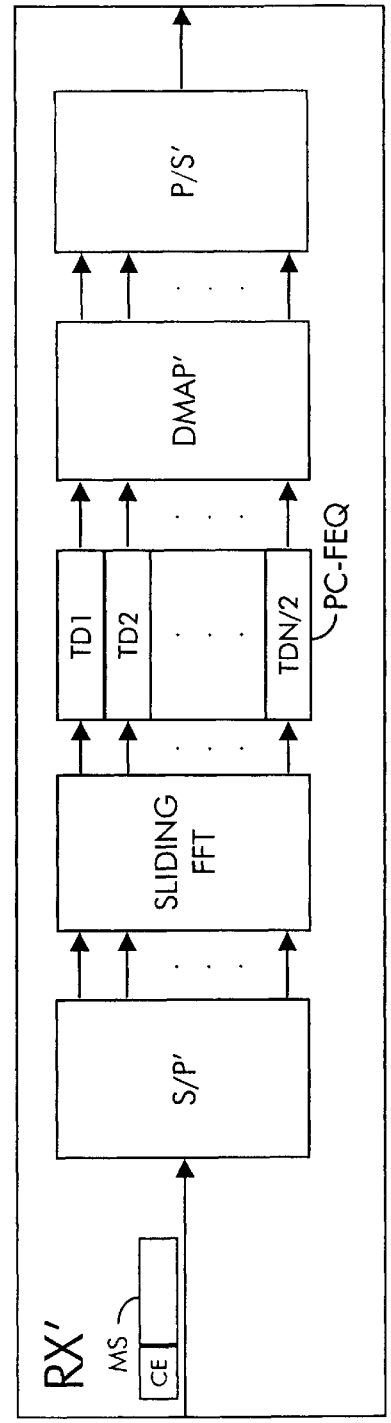
FIG. 2 represents a block scheme of an embodiment of the multicarrier receiver RX' according to the present invention.

The multicarrier receiver RX' drawn in FIG. 2 includes a serial to parallel converter S/P', a sliding fast Fourier transformer SLIDING FFT, a per-carrier frequency domain equaliser PC-FEQ, a demapper DMAP' and a parallel to serial converter P/S'. The per-carrier frequency domain equaliser PC-FEQ contains Nu tapped delay lines where Nu is the number of used carriers in a multicarrier symbol, which has to be less than or equal to N/2, N being the FFT size. The tapped delay lines are indicated by TD1, TD2, . . . , TDN/2 in FIG. 2.

The serial to parallel converter S/P', the sliding fast Fourier transformer SLIDING FFT, the per-carrier frequency domain equaliser PC-FEQ, the demapper DMAP' and the parallel to serial converter P/S' are cascade coupled between an input part and output part of the multicarrier receiver RX'. In particular, the tapped delay lines TD1, TD2, . . . , TDN/2 are coupled between respective outputs of the sliding fast Fourier transformer SLIDING FFT and respective inputs of the parallel to serial converter P/S'.

The samples of the cyclically extended multicarrier symbol MS, when received by the multicarrier receiver RX', are paralleled by the serial to parallel converter P/S' without having passed any equaliser. The extended multicarrier symbol MS then is supplied to the sliding fast Fourier transformer SLIDING FFT which converts different parts of the extended multicarrier symbol MS from time domain to frequency domain by calculating several consecutive Fourier transformations. The parts of the extended multicarrier symbol MS that are transformed all have the length of a non extended multicarrier symbol, i.e. the FFT size. The sliding fast Fourier transformer SLIDING FFT for example Fourier transforms a first part of the multicarrier symbol MS starting from the first sample of this multicarrier symbol MS. The length of the first part equals the length of a non-extended multicarrier symbol. In addition, the sliding fast Fourier transformer SLIDING FFT for example Fourier transforms a second part of the multicarrier symbol MS starting from the second sample of this multicarrier symbol MS. The length of this second part also equals the length of a non-extended multicarrier symbol. And so on. The sliding fast Fourier transformer SLIDING FFT in this way calculates at most an amount of Fourier transforms equal to the number taps of the tapped delay lines TD1, TD2, . . . , TDN/2 in the per-carrier frequency domain equaliser PC-FEQ. The resulting frequency domain multicarrier symbols ore applied to the per-carrier frequency domain equaliser PC-FEQ. In the per-carrier frequency domain equaliser PC-FEQ, each carrier is equalised by an individual equaliser or tapped delay line TD1, TD2, . . . , TDN/2. Each tapped delay line TD1, TD2, . . . , TDN/2 contains T complex taps. T Fourier transforms are thus calculated by the sliding fast Fourier transformer SLIDING FFT. The taps of a tapped delay line TD1 are adopted on the basis of a mean square error (MSE) criterion that optimises the signal to noise ratio (SNR) for transmission of that carrier over the transmission channel between multicarrier transmitter and multicarrier receiver RX'. The equalised carriers at the output of the per-carrier frequency domain equaliser PC-FEQ are applied to the demapper DMAP' which decodes the exact amount of bits from each carrier using the appropriate constellation schemes and the bits sourced by this demapper DMAP' are serialised by the parallel to serial converter P/S'.

In this paragraph, it is mathematically proven that the functionality of the time domain equaliser TEQ, fast Fourier transformer FFT and frequency domain equaliser FEQ of the traditional multicarrier receiver RX drawn in FIG. 1, can be provided for by the cascade connection of the sliding fast Fourier transformer SLIDING FFT and per-carrier frequency domain equaliser PC-FEQ of the newly proposed multicarrier receiver RX' drawn in FIG. 2. In other words, in this paragraph the equivalence of both structures is proven. The original multicarrier receiver RX makes the following operation:

$$\begin{pmatrix} Z_1^k \\ \cdots \\ Z_i^k \\ \cdots \\ Z_N^k \end{pmatrix} = \begin{pmatrix} D_1 & 0 & \cdots & & 0 \\ 0 & \cdots & & & \cdots \\ \cdots & & D_i & & \\ & & & \cdots & 0 \\ 0 & \cdots & & 0 & D_N \end{pmatrix} \cdot F_N \cdot (Y \cdot w) \quad (1)$$

Herein, the following notation is used $Z_i^k$: represents for a multicarrier symbol MS with index k the output of the frequency domain equaliser FEQ in FIG. 1 for carrier i;

$D_i$: is the complex tap value of the frequency domain equaliser FEQ for carrier i; and $F_N$: is an N by N matrix representing the fast Fourier transformer FFT;

Further is:

$$Y = \begin{pmatrix} y_{k \cdot s+v} & y_{k \cdot s+v-1} & \cdots & y_{k \cdot s+v-T+1} \\ y_{k \cdot s+v+1} & y_{k \cdot s+v} & \cdots & y_{k \cdot s+v-T+2} \\ \cdots & \cdots & & \cdots \\ y_{(k+1) \cdot s-1} & y_{(k+1) \cdot s-2} & \cdots & y_{(k+1) s \cdot T} \end{pmatrix} \quad (2)$$

an N by T matrix with:
- y: the digitised channel output;
- $Y_n$ the n-th sample of the channel output;
- N: the length (amount of samples) of a non extended multicarrier symbol;
- v: the length (amount of samples) of the cyclic extension CE of a multicarrier symbol MS;
- s: the length (amount of samples) of a multicarrier symbol MS so that s=N+v; and
- T: the length (amount of taps) of the time domain equaliser TEQ.

In expression (1), w represents the real T taps time domain equaliser TEQ and therefore can be written as follows:

$$w = (w_0 \ w_1 \ \ldots \ w_{T-1})^T \quad (3)$$

For carrier i, expression (1) can be rewritten as:

$$Z_i^k = D_i \cdot \text{row}_i(F_n \cdot Y) \cdot w \quad (4)$$

Herein $F_N \cdot Y$ represents T Fourier transforms, each Fourier transform being applied to a subsequent part of the k-th multicarrier symbol. These subsequent parts constitute subsequent columns in matrix Y. $F_N \cdot Y$ in other words is a matrix representing the operation performed by the sliding fast Fourier transformer SLIDING FFT drown in FIG. 2. Taking into account the associativity of the matrix product, equation (4) is equivalent to:

$$Z_i^k = \text{row}_i(F_N \cdot Y) \cdot D_i \cdot w \quad (5)$$

wherein $D_i \cdot w$ can be interpreted as representing a T taps complex tapped delay line TDi for carrier i. If $D_i \cdot w$ is replaced by $w_i$ in expression (5), it becomes clear from:

$$Z_i^k = \text{row}_i(F_N \cdot Y) \cdot w_i \quad (6)$$

that the functionality of the multicarrier receiver RX of FIG. 1, mathematically expressed by expression (1), is equal to that of the multicarrier receiver RX' of FIG. 2, mathematically represented by expression (6). The latter receiver structure however incorporates a T taps tapped delay line for each carrier which can be optimally tuned independently of the tapped delay lines for the other carriers whereas in the former structure, adaptation of the time domain equaliser TEQ taps w inevitably has an influence on the equalisation of all carriers.

It is remarked that although the tapped delay lines TD1, TD2, . . . , TDN/2 in the per-carrier frequency domain equaliser PC-FEQ of the above described embodiment all have a length of T taps, the capacity of the multicarrier system is better optimised if the number of taps in the tapped delay lines TD1, TD2, . . . , TDN/2 is not fixed but made controllable. In this way, the number of taps to equalise strongly affected carriers can be increased and the number of taps used to equalise less affected carriers or unused carriers is reduced. A controllable length of the tapped delay lines TD1, TD2, . . . , TDN/2 however requires the presence of means which determine the length of the tapped delay lines TD1, TD2, . . . , TDN/2 on the basis of for instance noise measurements at the different frequencies or on the basis of control signals indicating which carriers are used to transfer data by the multicarrier transmitter. Furthermore, it is noticed that in an embodiment with adoptive amounts of taps in the tapped delay lines TD1, TD2, . . . , TDN/2, the sliding fast Fourier transformer SLIDING FFT has to calculate an amount of Fourier transforms equal to the largest number of taps in a tapped delay line.

It is further noticed that in contrast with one Fourier transform per received multicarrier symbol in the multicarrier receiver RX, in the present multicarrier receiver RX' T Fourier transforms per multicarrier symbol have to be calculated. Nevertheless, complexity is only slightly increases thereby since the sliding Fourier transformer SLIDING FFT can deduce T–1 Fourier transforms from the first Fourier transform by simply adding and subtracting terms thereto or therefrom, as will be shown below. The linear operations required to determine the T–1 additional Fourier transforms moreover can be incorporated in the tap coefficients of the per-carrier frequency domain equaliser PC-FEQ. Indeed, the known multicarrier receiver RX with time domain equaliser TEQ, fast Fourier transformer FFT and frequency domain equaliser FEQ performs one Fourier transformation per multicarrier symbol. Thereto a magnitude of N.log(N) operations per $$\frac{N}{F_s}$$

seconds have to be performed with N the length of a multicarrier symbol and $F_s$ the sample frequency. The time domain equaliser TEQ with its T taps requires T multiplications and T–1 additions to be performed in $$\frac{1}{F_s}$$

seconds. The frequency domain equaliser FEQ performs Nu complex multiplications per $$\frac{N}{F_s}$$

seconds since it is assumed that Nu carriers are used. The multicarrier receiver RX' according to the present invention requires T fast Fourier transforms to be calculated and has at most $$\frac{N}{2}$$

tapped delay lines TD1, TD2, . . . , TDN/2 with T taps each. This seems to lead to a much higher total complexity. However, the vectors that are Fourier transformed, are formed by shifting the previous vector over one element and appending one new element. This relationship allows the sliding Fourier transformer SLIDING FFT to compute the T Fourier transforms in an efficient way. Only one full Fourier transform is calculated and the T−1 remaining Fourier transforms are calculated as follows:

$$(F_N \cdot Y(:, m+1)) = (F_N \cdot Y(:, m)) \cdot p + \begin{pmatrix} 1 \\ \vdots \\ 1 \end{pmatrix} \cdot (y_{new} - y_{old}) \quad (7)$$

Herein, m is an index going from 1 to T−1, $Y(:,m+1)$ represents the (m+1)-th column of matrix Y in expression (2) whose first element is given by $y_{new}$, $Y(:,m)$ represents the m-th column of matrix Y whose last element is given by $Y_{old}$, and p is a vector containing the exponential coefficients typically used in Fourier transformations:

$$p = (\alpha^0 \; \alpha^1 \; \alpha^{N-1})^T \text{ with } \alpha = e^{-j2\pi \frac{1}{N}} \quad (8)$$

The sliding fast Fourier transformer SLIDING FFT consequently starts by calculating the Fourier transformation of the first column of matrix Y and deduces the T−1 other Fourier transforms therefrom via a linear combination of the Fourier transform samples and T−1 difference terms. Indeed, the m-th Fourier transform calculated by the sliding fast Fourier transformer SLIDING FFT is guven by:

$$Y^k(m) = \sum_{n=0}^{2N-1} y_{m+n} \cdot e^{j\frac{2\pi k n}{2N}} \quad (9)$$

whereas the (m+1)-th Fourier transform is given by:

$$Y^k(m+1) = \sum_{n=0}^{2N-1} y_{m+1+n} \cdot e^{j\frac{2\pi k n}{2N}} \quad (10)$$

Substitution of n+1 by n' in formula (10) results in:

$$Y^k(m+1) = \sum_{n'=1}^{2N} y_{m+n'} \cdot e^{j\frac{2\pi k (n'-1)}{2N}} \quad (11)$$

$$= \left[ \sum_{n'=0}^{2N-1} y_{m+n'} \cdot e^{j\frac{2\pi k n'}{2N}} \right] \cdot e^{-i\frac{2\pi k}{2N}} - y_m \cdot e^{-i\frac{2\pi k}{2N}} + $$

$$y_{m+2N} \cdot e^{j\frac{2\pi k(2N-1)}{2N}}$$

The expression (9) is found bock in (11) which means that (11) can be re-written as:

$$Y^k(m+1) = Y^k(m) \cdot e^{-i\frac{2\pi k}{2N}} - y_m \cdot e^{-i\frac{2\pi k}{2N}} + y_{m+2N} \cdot e^{i2\pi k} \cdot e^{-i\frac{2\pi k}{2N}} \quad (12)$$

Since $e^{i2\pi k} = 1$, equation (12) can be simplified into:

$$Y^k(m+1) = Y^k(m) \cdot e^{-i\frac{2\pi k}{2N}} + (y_{m+2N} - y_m) \cdot e^{-i\frac{2\pi k}{2N}} \quad (13)$$

$$= [Y^k(m) + (y_{m+2N} - y_m)] \cdot e^{-i\frac{2\pi k}{2N}}$$

In matrix notation, this is expressed by formula (7). As already mentioned, the linear combinations can be incorporated in the per-carrier frequency domain equaliser PC-FEQ. The computational complexity of the per-carrier frequency domain equaliser PC-FEQ is proportional to the number of carriers used, Nu, and to the overage length of the tapped delay lines TD1, TD2, . . . , TDN/2 in case the number of taps is different for different tapped delay lines. Since the overage length of the tapped delay lines TD1, TD2, . . . , TDN/2 is significantly smaller than the length of the time domain equaliser TEQ in the known multicarrier receiver RX, the number of operations performed by the multicarrier receiver RX' may be smaller than the amount of operations executed within the known multicarrier receiver RX or in the worst case, is of the same magnitude.

Figure 3:
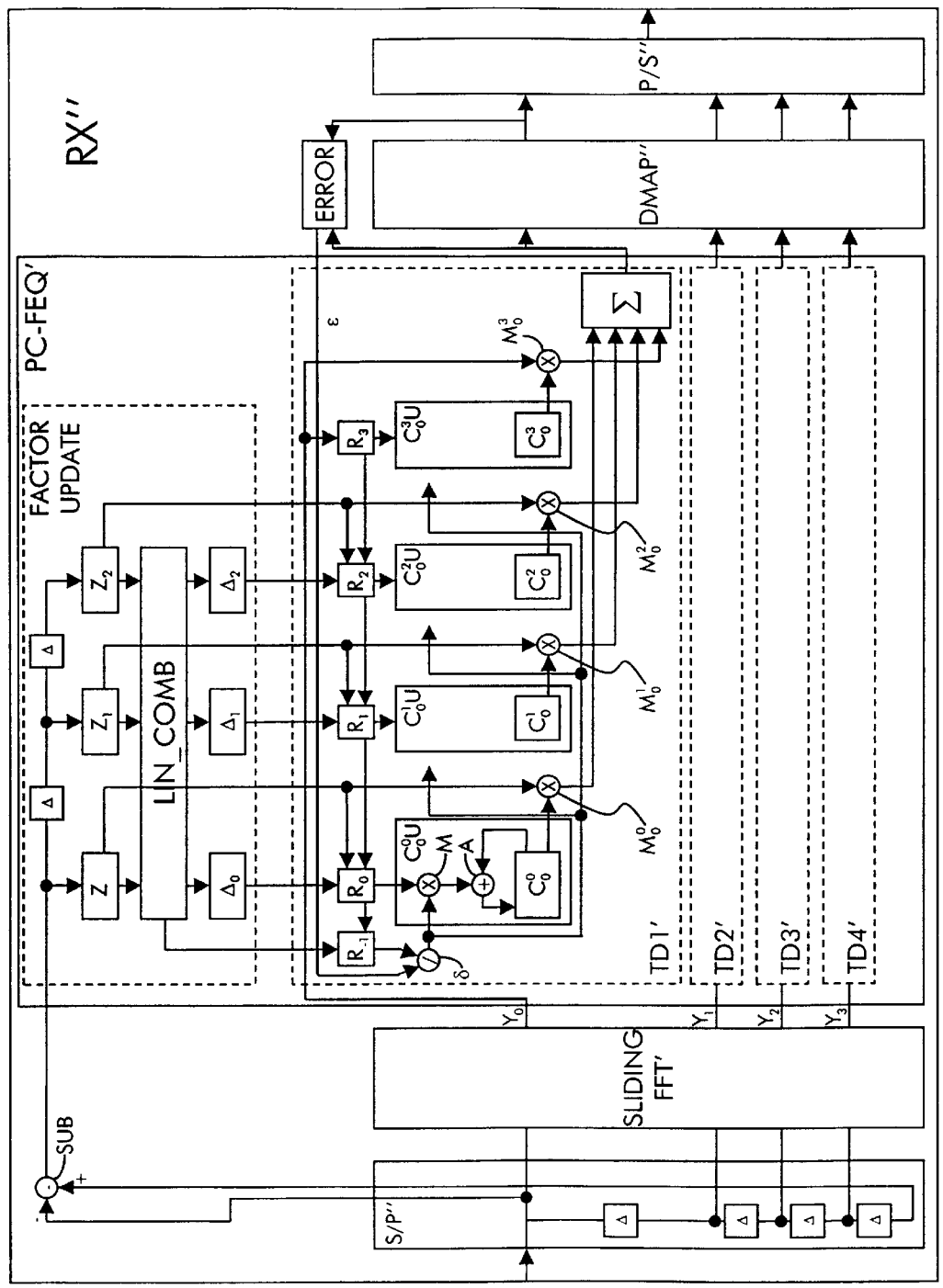
FIG. 3 represents a block scheme of a preferred embodiment of the multicarrier receiver RX" according to the present invention wherein an RLS-based initialisation technique is applied.

FIG. 3 shows a preferred embodiment of the multicarrier receiver RX" according to the present invention. In this preferred implementation of the current invention, the calculation of the additional Fourier transforms as a linear combination of Fourier transform samples $Y_0$, $Y_1$, $Y_2$ and $Y_3$ obtained after the first, full Fourier transformation and of difference terms $Z_0$, $Z_1$ and $Z_2$ is integrated in the per-carrier frequency domain equaliser PC-FEQ. In addition, the equaliser taps in the preferred embodiment of FIG. 3 are iteratively initialised via a low complexity Recursive Least Square (RLS) mechanism. The next paragraph describes the structure of the multicarrier receiver RX" drawn in FIG. 3. Its working, and in particular the advantageous tap initialisation technique applied therein, will be set out in the paragraphs immediately following.

On abstract level, the multicarrier receiver RX" of FIG. 3 just like the multicarrier receiver RX' of FIG. 2 contains the cascade coupling of a serial to parallel converter S/P", a sliding fast Fourier transformer SLIDING FFT', a per-carrier frequency domain equaliser PC-FEQ', a demapper DMAP", and a parallel to serial converter P/S". Except for the sliding fast Fourier transformer SLIDING FFT' and the per-carrier frequency domain equaliser PC-FEQ', the just mentioned functional blocks perform the same tasks as the functional blocks with the same name in the multicarrier receiver RX' of FIG. 2. The delay elements A of the serial to parallel converter S/P" are explicitly drawn in FIG. 3. They each apply a delay of one sample period and can also be used to implement the serial to parallel converter P/S' of FIG. 2. The per-carrier frequency domain equaliser PC-FEQ' of FIG. 3 contains four tapped delay lines TD1', TD2', TD3' and TD4', a subtracter SUB and a tap control factor updating device FACTOR UPDATE. This tap control factor updating device FACTOR UPDATE comprises two delay elements Δ, difference term registers $Z_0$, $Z_1$ and $Z_2$, a Recursive Least Square (RLS) based linear combination device LIN_COMB, and tap control factor registers $\Delta_0$, $\Delta_1$ and $\Delta_2$. The negative input of the subtractor SUB is connected to the input of the first one of the delay elements Δ of the serial to parallel converter S/P", and the positive input of the subtractor SUB is connected to the output of the last one of these delay elements Δ. The output terminal of the subtractor SUB serves as an input for the tap control factor updating device FACTOR UPDATE and therein is connected to the cascade coupling of the two delay elements Δ. In the tap control factor updating device FACTOR UPDATE, the input of the first delay element, the output of the first delay element and the output of the second delay element are respectively interconnected with input terminals of the first, second and third difference term register $Z_0$, $Z_1$ and $Z_2$. Outputs of the just mentioned difference term registers $Z_0$, $Z_1$ and $Z_2$ serve as inputs for the RLS based linear combination device LIN_COMB and as inputs for the tapped delay lines TD1', TD2', TD3' and TD4'. In the tap control factor updating device FACTOR UPDATE, output parts of the RLS based linear combination device LIN_COMB are coupled to input parts of the tap control factor registers $\Delta_0$, $\Delta_1$ and $\Delta_2$ and these tap control factor registers $\Delta_0$, $\Delta_1$ and $\Delta_2$ are further coupled to control inputs of the tapped delay lines TD1', TD2', TD3' and TD4'. The four tapped delay lines TD1', TD2', TD3' and TD4' are supposed to have a similar structure, each consisting of four taps. As already mentioned before in this patent application, the applicability of the present invention is not limited to per-carrier frequency domain equalisers wherein all tapped delay lines have the same number of taps. The number of taps may be different for different tapped delay lines, and may even be adaptable during initialisation and/or operation of the system. For the sake of simplicity of the figure and because the RLS-based initialisation procedure will be emphasised in the following paragraphs rather than the adaptive nature of the length of the tapped delay lines, it is supposed that the tapped delay lines TD1', TD2', TD3' and TD4' of the per-carrier frequency domain equaliser PC-FEQ' of FIG. 3 have the same length, i.e. four taps. All tapped delay lines TD1', TD2', TD3' and TD4' consequently have a structure similar to that of the first tapped delay line TD1' which is drawn in detail. This first tapped delay line TD1' contains a divider $\delta$, five rotation devices $R_{-1}$, $R_0$, $R_1$, $R_2$ and $R_3$, four complex coefficient registers $C_0^0$, $C_0^1$, $C_0^2$ and $C_0^3$, each surrounded by a coefficient updating circuit $C_0^0 U$, $C_0^1 U$, $C_0^2 U$ and $C_0^3 U$ respectively. Coefficient, updating circuit $C_0^0 U$ is drawn in detail and contains a multiplier M and an adder A in addition to the coefficient register $C_0^0$. The output part of the first tap control factor register $\Delta_0$ is coupled to a first input of the multiplier M via the rotation device R and an output $\epsilon_0$ of an error measuring device ERROR is connected to a second input of the multiplier M via the divider $\delta$. Similar to the first tap control factor register $\Delta_0$, the second tap control register $\Delta_1$ and the third tap control factor register $\Delta_2$ are coupled to inputs of respectively the second coefficient updating circuit $C_0^1 U$ and the third coefficient updating circuit $C_0^2 U$ via respectively rotation device $R_1$ and rotation device $R_2$. An additional output of the linear combination device LIN_COMB in the tap control factor updating device FACTOR UPDATE is coupled to a second input of the divider $\delta$ via the rotation device $R_1$. Furthermore the rotation devices $R_1$, R, $R_1$, $R_2$ and $R_3$ are inversely interconnected. The output of the multiplier M is coupled to a first input of the adder A, and an output of the coefficient register $C_0^0$ is connected to a second input of the odder A. The output terminal of the adder A is feedback coupled to the input of the coefficient register $C_0^0$. The above mentioned error measuring device ERROR is coupled between the input and output of the decision device or demapper DMAP' and has the task to compare the input and output of the decision device DMAP". As a result of the comparison, error signals are generated. Such an error device may also be supposed to form part of the multicarrier receiver RX' drawn in FIG. 2 because initialisation of the taps of the per-carrier frequency domain equaliser PC-FEQ, irrespective of whether this is realised via LMS (Least Mean Square) or RLS (Recursive Leost Square) techniques, requires estimation of the error after decision. Such error estimation may be performed by measuring the difference between the input and output of the decision device or demapper, or may be done by comparing the output of the decision device with the expected output in case a pre-defined initialisation sequence is sent to the receiver. In addition to the coefficient updating circuits $C_0^0 U$, $C_0^1 U$, $C_0^2 U$ and $C_0^3 U$, four multipliers $M_0^0$, $M_0^1$, $M_0^2$ and $M_0^3$, and a summator $\Sigma$ are foreseen in the tapped delay line TD1'. Outputs of the coefficient registers $C_0^0$, $C_0^1$, and $C_0^2$ as well as outputs of the difference term registers $Z_0$, $Z_1$ and $Z_2$ are coupled to first and second inputs of the multipliers $M_0^0$, $M_0^1$, and $M_0^2$. To the inputs of the multiplier $M_0^3$ an output terminal of the coefficient register $C_0^3$ is connected and an output Y of the sliding fast Fourier transformer SLIDING FFT is coupled via the rotation device $R_3$. The outputs of the difference term registers $Z_0$ $Z_1$ and $Z_2$ are also coupled to inputs of the rotation devices R, $R_1$ and $R_2$. The output terminals of the multipliers $M_0^0$, $M_0^1$, $M_0^2$ and $M_0^3$ are interconnected with inputs of the summator $\Sigma$, and an output of the just mentioned summator $\Sigma$ serves as input for the decision device or demapper DMAP'.

The tapped delay lines TD1', TD2', TD3' and TD4' generate samples of equalised DMT (Discrete Multi Tone) symbols, that are supplied to the decision device or demapper DMAP". A sample of such an equalised DMT (Discrete Multi Tone) symbol is, as already demonstrated above, a linear combination of the difference terms $Y_{m+N} - Y_m$ and the outputs $Y_m$ of the sliding fast Fourier transformer SLIDING FFT. The difference terms are calculated by the subtractor SUB and memorised in the difference term registers $Z_0$, $Z_1$ and $Z_2$. The memorised difference terms are linearly combined with the output Ym of the sliding fast Fourier transformer SLIDING FFT by the multipliers $M_0^0$, $M_0^1$, $M_0^2$ and $M_0^3$, and the summator $\Sigma$ in the tapped delay lines TD1', TD2', TD3' and TD4'. The coefficients used for the linear combination are the complex equaliser taps stored in the coefficient registers $C_0^0$, $C_0^1$, $C_0^2$ and $C_0^3$. These coefficients are iteratively initialised, taking into account the errors $\epsilon_0$ measured between the input and output of the decision device or demapper DMAP". A Least Mean Square (LMS) based technique to adjust the coefficients would have poor convergence properties and consequently would require an extremely large number of training symbols to be processed so that the initialisation procedure would become too time consuming. The iterative initialisation procedure of the equaliser coefficients $C_0^0$, $C_0^1$, $C_0^2$ and $C_0^3$ therefor is based on the Recursive Least Square (RLS) technique, a technique that is well known from the book 'An Introduction to Adaptive Signal Processing' from the authors M. Moonen and Ian Proudler. This book is downloadable from the internet via URL 'http://www.esat.kuleuven.ac.be/~moonen/asp_course.html'. According to this Recursive Least Square (RLS) method, equaliser coefficient $C_0^0$ is updated as follows:

$$C_0^0(t+1) = C_0^0(t) + \frac{\epsilon_0(t)}{\delta} \cdot R(\Delta_0(t)) \qquad (14)$$

Herein, t represents a time index, $\epsilon_0(t)$ represents the measured error at time t, $\delta$ represents a division factor, which is determined by rotating the output of the linear combination device LIN_COMB as described in the cited book from M. Moonen and l. Proudler, and $R(\Delta(t))$ represents the output of the rotation device $R_0$. The latter output of the rotation device $R_0$ depends on the contents of the difference terms register $Z_0$ and the tap control factor register $\Delta_0$ in a well-known way, typical for RLS-based techniques and described in the already cited book 'An Introduction to Adaptive Signal Processing' from M. Moonen. This dependence, which is a linear combination plus a rotation, is implemented by the linear combination device LIN_COMB for the part that is common to all carriers and by the rotation device $R_0$ for the part that is different for different carriers. The update of coefficient $C_0^0$ as expressed in formula (14) is realised by the multiplier M and the adder A in the coefficient updating device $C_0^0 U$. The division factor $\delta$ is also different for each carrier and consequently has to be calculated in the tapped delay lines TD1', TD2', TD3' and TD4'. For the first tapped delay line TD1', this is realised by the rotation device $R_{-1}$.

Because the difference terms $Z_0$, $Z_1$ and $Z_2$ used to generate the output samples of the per-carrier frequency domain equaliser PC-FEQ' are the same for all carriers, the tap control factors are also common for all carriers and as a result do not have to be calculated for each carrier or each tapped delay line. The computational complexity to initialise the equaliser coefficients of all tapped delay lines consequently is comparable to the computational complexity required to initialise the coefficients of one tapped delay line in case the RLS-based initialisation technique is used. The optimal convergence properties of the RLS-based technique are obtained without unacceptable increase of computational cost although this would have been expected by any person skilled in the art because RLS-based mechanisms are known to be complex in terms of amount of calculations. That an RLS-based coefficient initialisation algorithm can be used to initialise the coefficients of a per-carrier frequency domain equaliser without significant increase of mathematical complexity is based on the insight that the major portion of the calculations is common for all carriers, so that this portion of the calculations independently from the number of carriers has to be executed only once. With the RLS-based technique described above, convergence of the initialisation is achieved with less than 100 training symbols whereas the LMS based technique requires thousands of training symbols to be processed.

It is further remarked that without significant performance penalty, the number of multiplications to be carried out per training symbol can even further be reduced if carriers are combined in groups.

Another remark is that the RLS-based tap updating mechanism described in the previous paragraph can be used to update the equaliser taps during operation as well as during initialisation.

It is also to be remarked that the present invention is suitable for application in a multicarrier environment as ADSL (Asynchronous Digital Subscriber Line) or VDSL (Very High Speed Digital Subscriber Line) wherein the DMT (Discrete Multi Tone) multicarrier modulation is used. Nevertheless, applicability of the present invention is not restricted to a particular kind of transmission medium (twisted pair telephone line, coax cable, satellite link, . . . ) or to any particular kind of physical layer transfer protocol (ADSL, VDSL, . . . ). In fact, the invention can be applied in any kind of multicarrier system making use of an FFT.

Another remark is that an embodiment of the present invention is described above in terms of functional blocks. From the functional description of these blocks, it will be obvious for a person skilled in the art of designing electronic devices how these blocks can be manufactured with well-known electronic components. A detailed architecture of the contents of the functional blocks therefore is not given.

While the principles of the invention have been described above in connection with specific apparatus, it is to be clearly understood that this description is mode only by way of example and not as a limitation on the scope of the invention.

What is claimed is:

1. A multicarrier receiver for receiving a sequence of cyclically extended multicarrier symbols, said multicarrier receiver comprising:
   a sliding Fourier transformer for executing a Fourier transform on parts of an extended multicarrier symbol, said parts having a length equal to the length of a non-extended multicarrier symbol, a first part starting from a first sample of said extended multicarrier symbol, and subsequent parts starting from subsequent samples of said extended multicarrier symbol; and
   a per-carrier frequency domain equaliser coupled to said sliding Fourier transformer, said per-carrier frequency domain equaliser comprising a plurality of tapped delay lines corresponding to carriers in said multicarrier symbol and coupled to respective outputs of said sliding Fourier transformer, at least one tapped delay line of said plurality of tapped delay lines comprising a plurality of taps which are determined so as to reduce the channel impulse response length thereby avoiding the need for a time domain equaliser.

2. The multicarrier receiver according to claim 1, wherein each of said tapped delay lines is provided with adaptive complex taps, and said multicarrier receiver further comprises means to adapt said adaptive complex taps for each of said tapped delay lines.

3. The multicarrier receiver according to claim 2, wherein said means to adapt said adaptive complex taps are equipped with means to apply a mean square error criterion for adaptation of said adaptive complex taps to thereby optimise signal to noise ratio for transmission of said multicarrier symbols.

4. The multicarrier receiver according to claim 1, wherein each of said tapped delay lines is provided with an adaptive amount of complex taps, and said multicarrier receiver further comprises means to adapt said amount of complex taps for each of said lapped delay lines.

5. The multicarrier receiver according to claim 1, wherein a delay between a first non zero tap of said tapped delay lines and a first output of said sliding Fourier transformer is different for different carriers.

6. The multicarrier receiver according to claim 1, wherein said sliding Fourier transformer comprises means to completely Fourier transform said first part to thereby generate a transformed first part, and means to derive Fourier transforms of said subsequent parts by subtraction and addition of some terms from and to said transformed first part.

7. The multicarrier receiver according to claim 6, wherein said means for subtraction and addition of said terms from and to said first part are integrated in said per carrier frequency domain equaliser.

8. The multicarrier receiver according to claim 1, wherein said multicarrier receiver further comprises:
   a. error measurement means coupled between an input and output of a decision device, and adapted to measure an error between multicarrier symbols before and after decision;
   b. linear combination means, coupled to an input of said sliding Fourier transformer and adapted to linearly transform difference terms to thereby generate coefficient control factors, said difference terms being constituted by subtraction of samples of said extended multicarrier symbol spaced apart over said length of said non-extended multicarrier symbol; and
   c. recursive least square updating means coupled to both said error measurement means and said linear combination device and adapted to iteratively update taps of each said tapped delay line on the basis of the recursive least square algorithm.

* * * * *